UNITED STATES PATENT OFFICE.

RICHARD HARTWIG, OF BERLIN, GERMANY, ASSIGNOR TO SIEMENS & HALSKE AKTIENGESELLSCHAFT, OF BERLIN, GERMANY.

PROCESS OF OBTAINING SOLUBLE STARCH.

No. 798,509. Specification of Letters Patent. Patented Aug. 29, 1905.

Application filed September 15, 1903. Serial No. 173,251.

*To all whom it may concern:*

Be it known that I, RICHARD HARTWIG, chemist, a subject of the German Emperor, residing at 3 Culmstrasse, Berlin, Germany, have invented a certain new and useful Improvement in Processes of Obtaining Soluble Starch, of which the following is a full, clear, concise, and exact description, such as will enable others skilled in the art to apply or use the same.

My present invention relates to an improved process for obtaining soluble starch from raw starch prepared from any vegetable material, especially maize.

The process consists, essentially, in subjecting dry raw or crude starch at ordinary temperatures, (about 50° to 86° Fahrenheit,) and during a prolonged time, to the action of an excess of gaseous chlorin.

In carrying out the process I prefer to lead the chlorin to the raw dry starch contained within suitable vessels—for instance, within wooden casks—until some excess of chlorin in a gaseous state is present. The mass treated in such manner is left to rest for some days—for instance, four to eight days. The action is stopped when samples taken from the contents of the casks are found to be perfectly soluble in hot water.

I am aware that it has been proposed heretofore to produce soluble starch by the employment of liquids containing chlorin and acids and to complete the result by subsequently heating the entire solution, and I make no claim hereinafter broad enough to include such a process, my invention eliminating the use of the acids and also the necessary subsequent step of the process of heating the solution, thereby greatly simplifying the before-mentioned process.

Having now particularly described and ascertained the nature of this invention and in what manner the same is to be performed, I declare that what I claim, and desire to secure by Letters Patent of the United States, is—

1. A process of obtaining soluble starch, especially maize or mercantile starch, which consists in subjecting dry raw starch at ordinary temperatures to the action of an excess of gaseous chlorin until samples taken from the treated mass are found to be clearly soluble in hot water.

2. The process of obtaining soluble starch, especially Indian corn or maize starch, which consists in subjecting raw starch in a dry state to temperatures of from 50° to 86° Fahrenheit to the action of an excess of gaseous chlorin and from a period of from four to eight days, or until the resultant product is found to be perfectly soluble in hot water.

In witness whereof I hereunto subscribe my name this 19th day of August, A. D. 1903.

RICHARD HARTWIG.

Witnesses:
HENRY HASPER,
WOLDEMAR HAUPT.